J. F. O'CONNOR.
FRICTION SHOCK ABSORBING MECHANISM.
APPLICATION FILED OCT. 4, 1920.
1,429,688.
Patented Sept. 19, 1922.
2 SHEETS—SHEET 1.
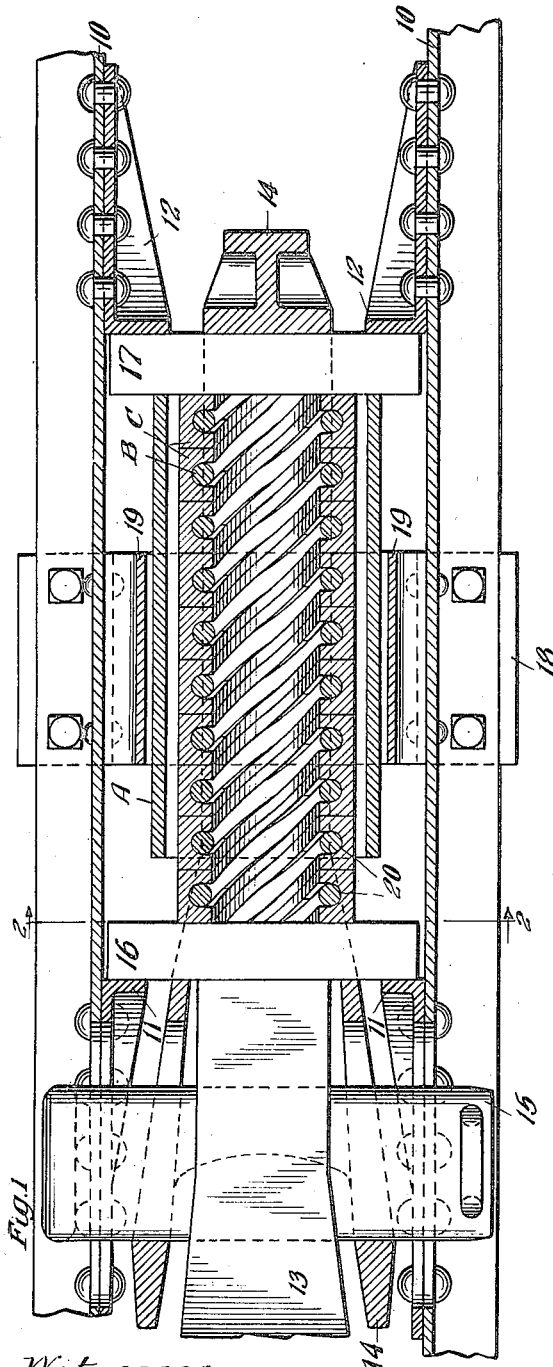
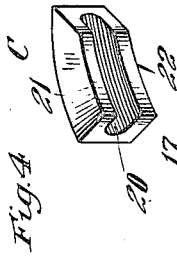
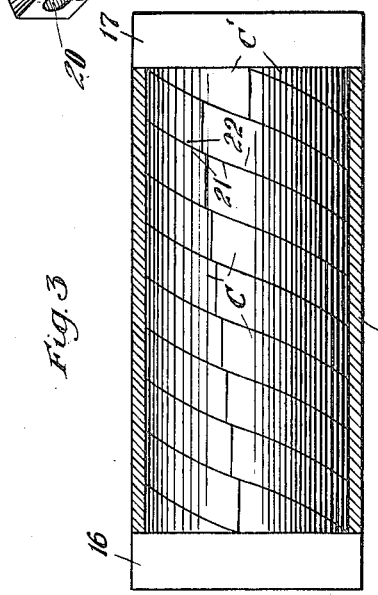
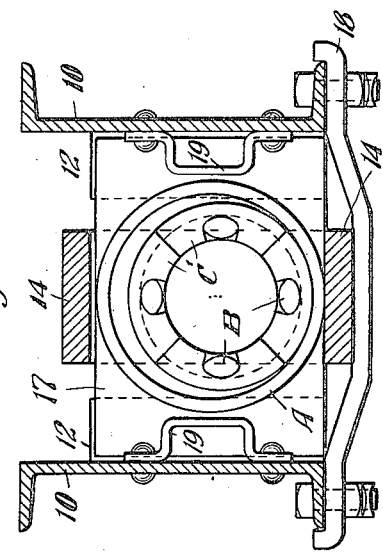
Witnesses
Wm. Geiger
Inventor
John F. O'Connor
By Geo. I. Haight
His Atty.

Patented Sept. 19, 1922.

1,429,688

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed October 4, 1920. Serial No. 414,662.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of this invention is to provide a friction shock absorbing mechanism embodying a friction spring in which is obtained a true friction action throughout the entire compression stroke from full release to full compression.

Another object of the invention is to provide a high capacity friction spring of novel type wherein no spaces are left between coils when the spring is in full release so as to obtain a maximum friction action for the full compression stroke.

Another object of the invention is to provide a friction shock absorbing mechanism in the form of a friction spring wherein the frictional capacity is obtained by sliding the helically formed elements on each other in helically developed paths.

Figure 5:
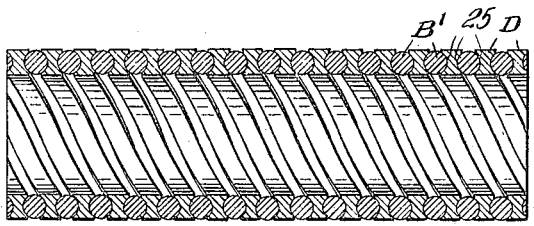
Figure 6:
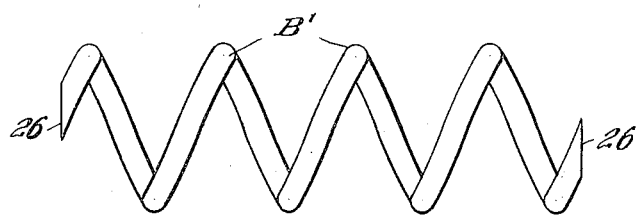
Figure 7:
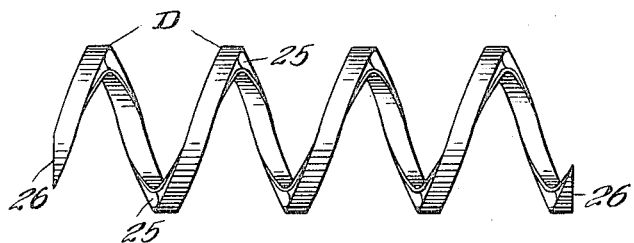

In the drawings forming a part of this specification, Figure 1 is a horizontal longitudinal sectional view of a portion of a railway draft rigging showing my improvements employed therein. Figure 2 is a vertical transverse sectional view corresponding substantially to the line 2—2 of Figure 1. Figure 3 is a part sectional view part elevational view of the shock absorbing mechanism proper shown in Figure 1 illustrating the condition of the shock absorbing unit under full compression. Figure 4 is a detail perspective of one of the friction blocks employed in the construction shown in Figure 1. Figure 5 is a longitudinal diametrical sectional view corresponding to Figure 1 but illustrating another embodiment of the invention. Figure 6 is an elevational view of one of the friction elements employed in the construction shown in Figure 5. And Figure 7 is a view similar to Figure 6 of another element employed in the construction shown in Figure 5.

Referring first to the construction illustrated in Figures 1 to 4 inclusive, 10—10 denote channel center or draft sills of a railway car to the inner faces of which are secured front stop lugs 11 and rear stop lugs 12. The rear portion of a drawbar is indicated at 13 to which is operatively connected a hooded cast yoke 14 by means of a coupler key 15. The shock absorbing mechanism proper, hereinafter described, is disposed within the yoke as are also a front follower 16 and a rear follower 17. The yoke and parts associated therewith are supported in position by a detachable saddle plate 18. To the inner faces of the draft sills are also secured inwardly extended centering plates 19—19 as most clearly indicated in Figure 2.

The shock absorbing unit proper, as shown, comprises, broadly, a cylindrical casing A and a nominally "solid" friction spring consisting of a plurality of helically coiled spring bars or rods B—B and a correspondingly arranged plurality of series of friction blocks C—C.

Each of the spring coils or bars B is continuous from end to end and is coiled with a very steep pitch. As shown in the drawings, there are four of said coils B. Each of the blocks C, which is preferably in the form of a casting, constitutes a section of a helically coiled unit having the same pitch as that of any one of the spring coils proper B. In actual practice, each block C will correspond to an arc of approximately 90°, as shown in Figure 2. Each block C is formed on its inner side with a helically extending groove or recess 20 to receive the bar B and the top and bottom faces 21 and 22 of each block correspond to helical surfaces generated by a line perpendicular to the axis of the spring which line is rotated and advanced in accordance with the pitch of the spring bars B. The ends of each block C are cut or extended radially. Certain of the friction blocks as indicated for instance at C'—C'— in Figure 3 are made tapered so as to bring their outer faces in planes perpendicular to the axis of the spring and the ends of the spring bars B will be correspondingly tapered or beveled as will be understood.

The normal condition of the friction unit is shown in Figure 1, that is, under full release. The exterior diameter of the friction spring is normally less than the interior diameter of the casing A and the length of the latter is less than the normal length of the friction spring as shown in Figure 1. The casing A is employed to act as a limiting means in determining the relative approach of the followers and also in limiting the increase in diameter of the friction spring, as hereinafter explained.

As shown in the drawings, the friction blocks C on the spring bars are in direct contact with each other in helical paths from end to end and the ends of adjacent blocks are also normally in contact with each other so that any particular helical series of blocks C constitutes, in effect, a helical unit corresponding to the particular spring bar B which is mounted therein. When pressure is applied to press the friction spring, the decrease in length which necessarily results is compensated for by an increase in diameter as will be seen from a comparison of Figures 1 and 3. During this action, it is apparent that the helical units may be in sections while the blocks C slide in helical paths one on the other and thereby generate a maximum amount of friction for the surface available. In addition to the friction there is of course the spring resistance proper obtainable from the bars B. In the release upon removal of the actuating pressure, the bars B return to their normal condition in the manner of the usual coil spring and will simultaneously restore the friction blocks carried thereby to their normal helical pitch, the blocks acting in the manner of a damper during the release action. In actual practice, the pitch of the various helices will be made such that the component of the actuating force that tends to slide the friction blocks one on the other will be great enough to overcome the resistance to such sliding movement resulting from the component of the actuating force that extends parallel to the axis of the spring. It is obvious that the pitch of the helices will vary for different metals.

In the construction shown in Figures 5, 6 and 7, similar coil spring bars B'—B' are employed as in the construction shown in Figures 1 to 4. Instead, however, of using series of independently formed blocks, I employ especially formed, helically coiled bars D—D of spring material interposed between the spring bars B'—B'. Each of the elements D is formed with a continuous concave groove 25 on each side thereof to accommodate the spring bars B'. In Figure 5 the friction spring is shown in its normal full release condition and contraction in its length, due to the compressing force, will be compensated for by an increase in diameter of the spring as in the case of the other arrangement hereinbefore described. The elements B' and D will of course have their ends tapered as indicated at 26—26 in order to obtain a flat bearing at the ends of the spring. The operation of the springs will be understood from the detailed description given in connection with the structure shown in Figures 1 to 4 inclusive.

I am aware that "friction springs", so-called, have been made heretofore but so far as I am aware, all of them have operated on the general principle of the usual coil springs having spaces between the various coils to allow for contraction in length. My improved friction spring differs from those of the prior art known to me by reason of the fact that no spaces are left between coils but on the contrary that the spring may be said to be "solid", even under full release. By this novel construction, I have obtained friction surfaces of unterrupted helical form which are always in contact with each other throughout their entire lengths and the friction generated is by the twisting in helical paths of one helical member on another as distinguished from the squeezing of one coil between another coil as in the former so-called "friction springs".

I have herein shown two arrangements by which my invention may be carried out but I am aware that there are many other constructions which may be employed without departing from the spirit of the invention and all changes and modifications coming within the scope of the claims appended hereto are contemplated.

I claim:

1. In a friction shock absorbing mechanism, a yieldable resistance unit comprising a plurality of steeply pitched helically arranged elements, adjacent elements having helically extending friction surfaces in contact with each other throughout their length when the unit is in normal uncompressed condition, said contacting elements always moving both equally and similarly from and toward the axis of the unit during compression and release, respectively.

2. In a friction shock absorbing mechanism, a yieldable resistance unit comprising a plurality of steeply pitched helically arranged elements, adjacent elements having helically extending friction surfaces in contact with each other throughout their length when the unit is in normal uncompressed condition, said elements being formed in sections arranged end to end with adjacent ends in engagement when the unit is in normal uncompressed condition.

3. As an article of manufacture, a yieldable resistance unit comprising: a plurality of intercalated helical elements of steep pitch, the adjacent surfaces of said elements being in contact throughout the length of the helical elements and the unit being entirely free from any axial coil spacing, all helical elements contracting and expanding simultaneously, similarly and uniformly.

4. As an article of manufacture, a yieldable resistance unit comprising a plurality of steeply pitched helical continuous spring bars and a plurality of steeply pitched helically arranged series of friction blocks mounted on said bars, said blocks having contacting frictional surfaces extending in helical paths, the blocks being arranged end to end.

5. In a friction shock absorbing mechanism, the combination with a hollow cylindrical casing; of a yieldable resistance unit disposed within said casing, said unit comprising a plurality of steeply pitched helically arranged elements, adjacent elements having helically extending friction surfaces in contact with each other throughout their length, the normal length of said unit being greater than the length of the casing and the exterior diameter of the unit being normally less than the interior diameter of the casing whereby the casing is adapted to act as a limiting device for the compression of the friction unit.

In witness that I claim the foregoing I have hereunto subscribed my name this 15th day of Sept. 1920.

JOHN F. O'CONNOR.

Witness:
CARRIE GAILING.